United States Patent [19]
Brady et al.

[11] 3,742,502
[45] June 26, 1973

[54] POLARIZATION REFERENCE FOR BEAM FLYING

[76] Inventors: Frank B. Brady, 5322 Carvel Road, Washington, D.C. 20016; Chester B. Watts, Jr., 6505 Pinecrest Court, Fairfax County, Va. 22003

[22] Filed: Jan. 9, 1970

[21] Appl. No.: 1,742

[52] U.S. Cl. ........ 343/107, 343/100 PE, 343/108 R
[51] Int. Cl. .............................................. G01s 1/14
[58] Field of Search ..................... 343/107, 100 PE; 244/3.13

[56] References Cited
UNITED STATES PATENTS

| | | | |
|---|---|---|---|
| 2,548,278 | 4/1951 | Wirkler | 343/107 |
| 2,998,941 | 9/1961 | Wilkes | 343/100 PE |
| 3,353,182 | 11/1967 | Hart | 343/100 PE X |

*Primary Examiner*—Benjamin A. Borchelt
*Assistant Examiner*—Richard E. Berger
*Attorney*—Wilfred G. Caldwell

[57] ABSTRACT

This invention relates to airborne antenna systems for the reception of signals from stations transmitting bearing information as displacement from a course-line or fixed beam such as VOR or runway localizer stations.

In addition to the usual antenna for receiving the course displacement signals, an antenna element is provided having an output signal which is responsive to the attitude of the airplane as referred to the polarization-plane of the radio field. This polarization-referenced signal is modulated for identification prior to being applied, together with the regular antenna signal, to the input terminal of a standard navigation receiver. At the receiver output, the modulation is recovered and applied to a phase-detector to provide an attitude signal containing information, necessary for stable beam flight, which would otherwise have to be obtained from gyro-horizon and directional gyro instruments.

11 Claims, 7 Drawing Figures

Patented June 26, 1973

$$\frac{OQ}{OP} = \cos G \cos A \sin B + \sin G \sin A$$

INVENTORS:
Frank B. Brady
Chester B Watts

POLARIZATION REFERENCE FOR BEAM FLYING

BACKGROUND—SUMMARY

The technique of flying beam systems by a combination of raw displacement and course heading has long been recognized as more difficult than flying computed command signals.

This difficulty is apparent in flying VOR, TACAN, and particularly ILS localizer with a simple unaided displacement instrument and a magnetic heading reference. The pilot must intercept the course, turn to course heading and then bracket the course in a series of small course changes to correct for cross-wind and compass errors. His corrected heading, once established, will change if wind shear is present. This procedure can be very demanding, particularly when other factors such as rough air are encountered.

Excellent instrumentation and flight control systems, incorporating gyros, have been developed which relieve the pilot of this mental computation and ease the workload involved in this process. The Sperry Zero Reader, using command signals only, and the Collins Flight Director system with a combination of command and situation (displacement and heading) have successfully overcome the difficulties mentioned. Unfortunately, their high cost and complexity put them out of reach of most owners and pilots of small aircraft.

In the airborne reception of localizer and VOR signals by the usual navigation receiver, not all of the potentially useful information is extracted from the signal. The radio fields which are radiated by VOR ground stations, and by localizers near the course-line, are horizontally polarized with high purity; vertical component is down 26 decibels or more. Detection of the plane of polarization of the radio signal can, thus, provide a good indication of the aircraft roll-attitude. In addition, sensing the azimuthal angle of arrival of the signal can provide an indication of aircraft heading relative to the transmitting station. These two components of the aircraft attitude are exactly the information needed, combined with the basic course displacement, to provide the command or "what-to-do" type of indication which results in stable beam flight even in the hands of a pilot with very little training.

It is an object of this invention to provide a signal responsive to the aircraft attitude derived from the normal radio fields received at the aircraft from VOR and ILS localizer stations. This may be done by means of an auxiliary antenna element, a modification of the regular airborne navigation antenna, or a re-designed combination antenna. This signal, modulated for identification, passes through the standard navigation receiver along with the regular modulations which indicate displacement from the course-line. At the receiver output, the attitude signal modulation is converted to a bi-polar d. c. signal compatible with the regular deviation indicator signal, which is ordinarily plus or minus 150 millivolts, full scale. Adding these two signals produces a null-bank command signal; the pilot banks to keep the command signal nulled.

This simple derivation of steering or command signals makes it possible to include the advantages of advanced instrumentation in classes of aircraft in which gyros with electrical pickoff and special displays would be regarded as too expensive.

LIST OF FIGURES

FIG. 1 (a) and (b) show views of the tail and forward portions of an airplane structure indicating several locations and antenna types suitable for providing navigation and polarization-referenced attitude signals.

FIG. 2 (b) is the same as FIG. 2 (a) but for combination dual-mode navigational and polarization reference antenna elements.

Figure 4:
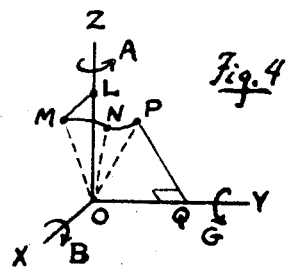

FIG. 4 defines the geometry used in computing the polarization reference antenna pick-up as a function of the bank angle, relative heading, and forward tilt.

Figure 5:
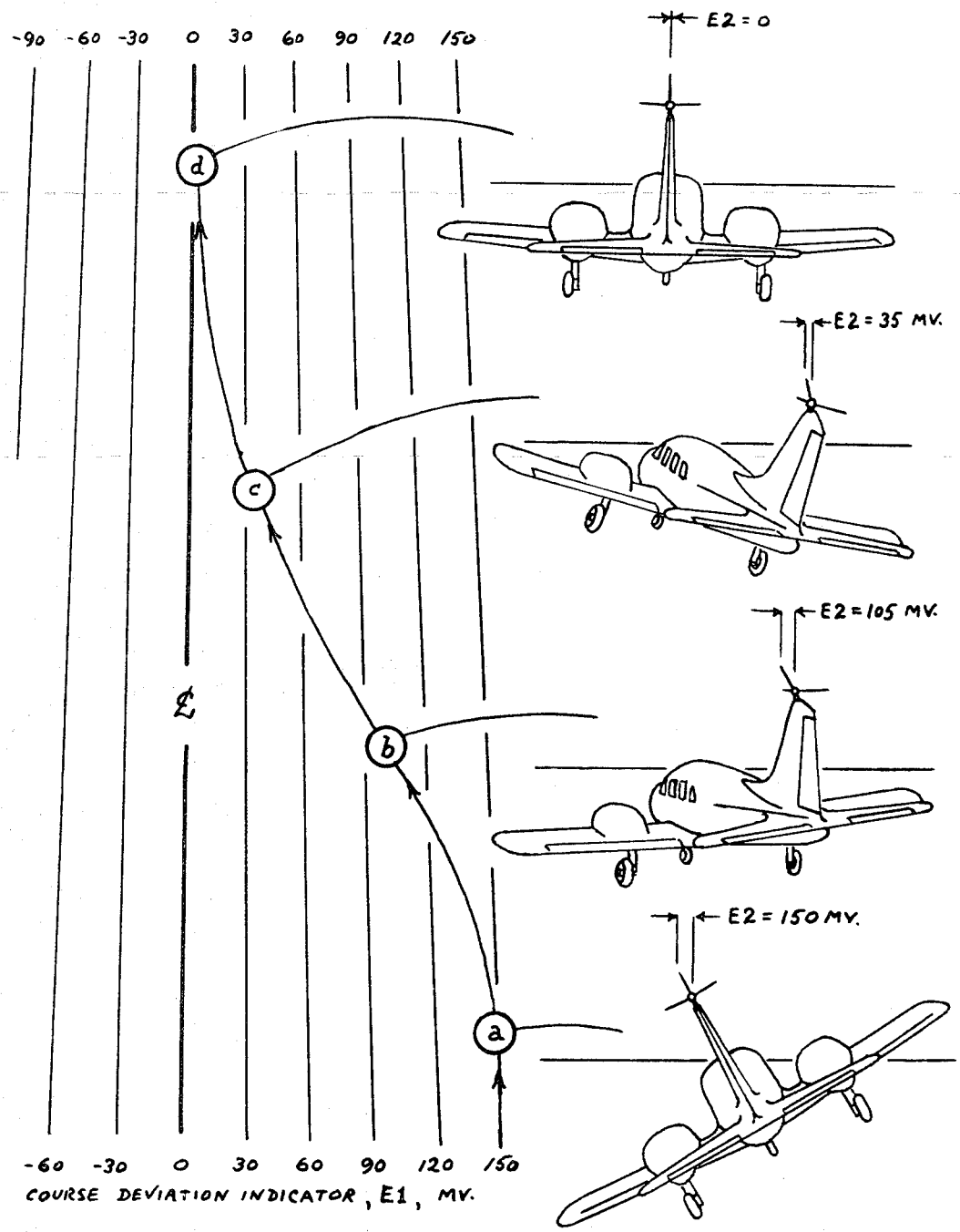

FIG. 5 provides an intuitive visualization of the flight-path followed by a pilot using a null-bank command meter to equate the polarization reference signal to the course displacement signal.

DESCRIPTION

Figure 1B:
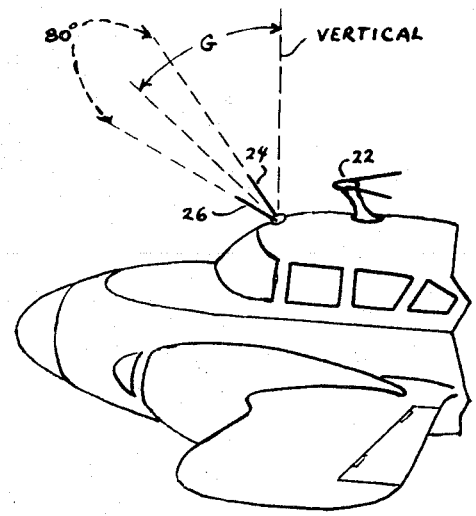
Figure 1A:
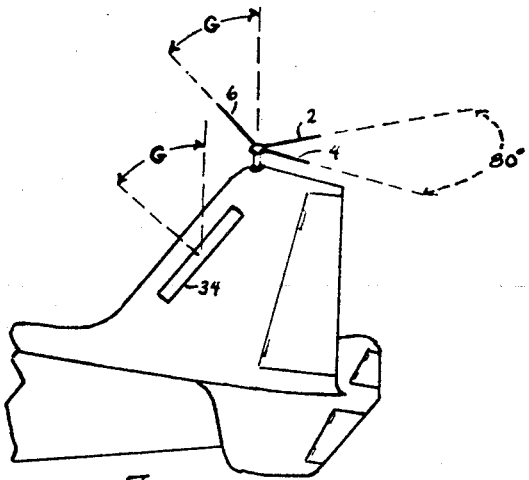

For airborne reception of the localizer and VOR navigational signals, an antenna that has been generally successful is the balanced V-type mounted on the tail atop the vertical stabilizer. See, for example, FIG. 21 of Hurley, Anderson and Keary, "CAA VHF Omnirange," Proc. I. R. E., vol. 39, pp 1506–1520, December, 1951. In FIG. 1 (a), rods 2 and 4 comprise the elements of such a balanced V-type antenna, the angle between the rods being 80°, more or less. This antenna receives horizontally polarized signals from front and rear about equally, and is down roughly 6 to 8 decibels at the sides.

For the purposes of this invention, the auxiliary monopole antenna, rod 6 is added to the balanced V-type antenna. Rod 6 lies in the vertical fore-and-aft plane of symmetry of the airframe, but may be tilted forward, by an angle G, from the vertical. From considerations of symmetry, it is apparent that rod 6 will pick up little or no signal when the airplane is headed, with wings level, directly toward a horizontally polarized transmitting station. Changes in the pitch-attitude do not affect this condition, but changes in either roll or yaw-attitudes will in general result in some signal in rod 6.

Figure 2B:
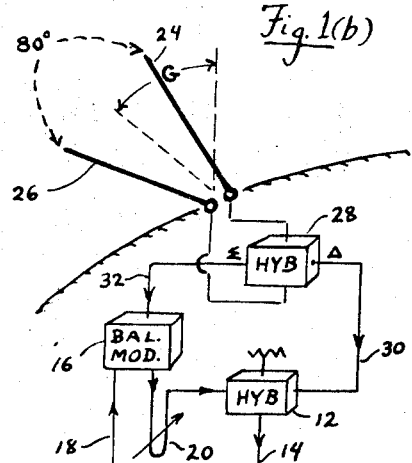
FIG. 2 (a) shows a modulation and signal-combining block diagram with separate navigational and polarization reference antenna elements.
Figure 2A:
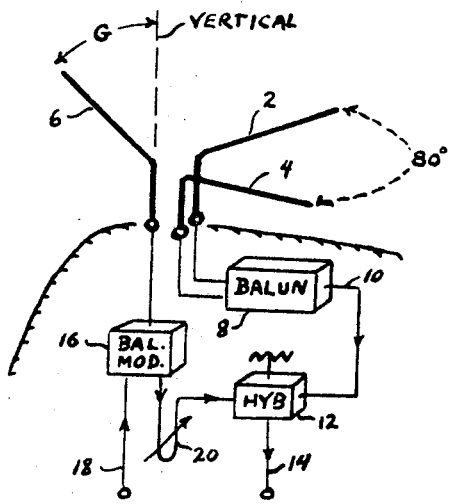

The connections to rods 2, 4, and 6 are shown in FIG. 2 (a). Rods 2 and 4, comprising the horizontal V-type antenna, are generally connected to some kind of balun 8 for providing 180° phase relation between the rods. The balun output cable 10, would ordinarily simply connect to the navigation receiver input, but in this case, the signal goes first through the isolation hybrid 12, thence to the receiver via cable 14. The polarization reference signal from rod 6 is fed into the balanced modulator 16, which is preferably a four-diode ring or some other simple type, supplied, via cable 18, with the modulating signal from a sinusoidal source of some suitable frequency, such as 1.7 kc/s, within the receiver band-width. The sideband signal thus produced is carried by the adjustable-length cable 20 to hybrid 12, combining there with the regular navigational signal, thence to the receiver via cable 14. It is necessary to chose a length for cable 20 such that the 1.7 kc/s sidebands, when added in hybrid 12 to the carrier of the navigational signal, are properly phased for amplitude modulation. This can be accomplished, for example experimentally, by varying the length of cable 20 to obtain a maximum of 1.7 kc/s voltage at the receiver output.

A popular alternate form of navigation antenna is the V-type mounted on a short mast over the forward cabin roof, such as antenna 22, FIG. 1 (b). Sometimes the mast portion of such an assembly is arranged to be fed separately as a vertical radiator for communications, as for example NARCO Catalog No. VCNA–2. In such a case, the mast can, instead, be used as the polarization-reference element, substituting for rod 6 in FIG. 2 (a). This has the advantage of accomplishing the purpose of this invention with a pre-existing antenna structure.

Another suitable antenna scheme is to use just two elements such as rods 24 and 26, FIG. 1 (b), inclined in mirror symmetry about the airframe vertical center-plane. The rods may be separated by an angle such as 80°, more or less, the angle bisector being, on the center-plane, tilted forward from the vertical by the angle G. FIG. 2 (b) shows how the two rods 24 and 26 may be made to function in two modes with the additional hybrid 28. The difference port of this hybrid is associated with a 180° phase relation of the elements, serving the same purpose as balun 8 in FIG. 2 (a). In the difference mode, rods 24 and 26, therefore, perform as a balanced V-type antenna, similar to rods 2 and 4, except for the tilt in the vertical plane. The tilt angle G, in this case, is preferably not less than 45°, in order not to sacrifice too much horizontal component. The regular navigational signal thus flows from the difference port through cable 30 to the isolation hybrid 12, thence to the receiver via cable 14 as before. In the sum mode, rods 24 and 26 have a zero phase relation, as though they were simply connected in parallel with each other. It is well known that two thin radiators connected in parallel behave much like a single fat one. The sum mode thus serves effectively as a replacement for the auxiliary monopole, rod 6. The polarization reference signal then is carried by cable 32 from the hybrid sum port to the balanced modulator 16, to be processed as before.

Yet another suitable form of antenna 34, FIG. 1 (a), utilizes a pair of cavity-backed slots, one on either side of the vertical stabilizer, the effective plane of electric field of the slots being inclined from vertical by the angle G. Such slot antennas can serve the purpose of this invention by substitution for the rods 24 and 26 in the dual-mode circuit of FIG. 2 (b).

Figure 3:
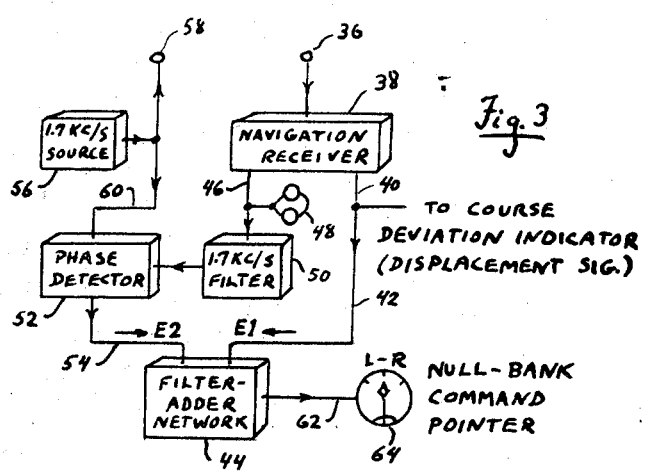
FIG. 3 is a block diagram showing interconnections and major components required to complete an operating polarization-referenced null-bank command system.

FIG. 3 shows a block diagram of the main components and interconnections needed to complete a polarization reference system. Terminal 36 connects to the standard navigation receiver 38 antenna input, receiving the signal from cable 14 in FIG. 2 (a) or (b). Line 40 carries the receiver's bi-polar d. c. output which drives the pilot's course deviation indicator needle. This signal, identified here as E1, is fed also, via line 42, to the filter-adder network 44. The receiver audio output line 46, feeds headset 48, and also the 1.7 kc/s band-pass filter 50. The output of filter 50, representing the polarization-referenced attitude signal, is then fed to phase detector 52 for conversion to a bi-polar d. c. signal identified here as E2, and carried via line 54 to the filter-adder network 44. The 1.7 kc/s source 56 supplies, via terminal 58, the modulating signal for the balanced modulator 16 in FIG. 2 (a) or (b). It also supplies, via line 60, the phase reference required by the phase detector 52. The filter-adder network 44 will in general comprise resistance and capacitance elements as desired for smoothing or otherwise time-modifying the signals E1 and E2, before combining them to form the algebraic difference (E1 − E2), fed via line 62 to null-bank command meter 64.

The behavior of signal E1 with position of the airplane is well known and is assumed to be in accordance with published descriptions of the system being flown, and is relatively independent of the attitude of the airplane. The behavior of the attitude signal E2, as generated in this invention, may be computed approximately from a consideration of the orientation of the auxiliary monopole, such as rod 6, with respect to the electric field vector of the radio signal radiated by the station. Signal E2 should be relatively independent of the displacement from the course-line.

In the argument which follows, it is assumed that we have a simple theoretical monopole, in which the axis of the radiation pattern coincides with the physical axis of the rod. This is not really true because there are currents on the airframe skin under the monopole which generally do not have axial symmetry with the rod. Nevertheless, the assumption will serve well enough for a rough calculation if we take care to locate the monopole on the airframe where it can be reasonably perpendicular to the local surface and also have a clear view forward to the transmitting station.

FIG. 4 shows a set of rectangular coordinates, centered on the airplane at the base of the monopole. The Z-axis always points to the zenith, and the X-axis is always in the direction of the transmitting station, with the radiated electric field vector thus coinciding with the Y-axis. The foregoing holds true while the maneuvering of the airplane changes the monopole orientation; the projection of the monopole upon the Y-axis is approximately proportional to the signal induced in the monopole.

First, imagine the airplane to be flying straight and level, the nose pointed along the X-axis, toward the station. The segment OL represents the monopole if it were oriented vertically. Now tilting it forward, by rotation through angle G about the Y-axis, results in the orientation OM. Since OM is in the X–Z plane, there is, as yet, no projection on the Y-axis, and no signal induced in the monopole. Next, suppose the airplane banks, by rotation through angle B about the X-axis, resulting in the orientation ON. This is followed by a change in heading, corresponding to rotation through angle A about the Z-axis, which results in the final orientation of the monopole, along segment OP. Now, dropping a perpendicular onto the Y-axis, we have the projection OQ, representing the induced signal. It can be shown by trigonometry that the length of OQ is given as follows:

$$OQ/OP = \cos G \cos A \sin B + \sin G \sin A$$

Note that for small bank and heading angles the first term in the above expression is roughly proportional to bank angle $B$, while the second term is roughly proportional to heading angle $A$. In applying the foregoing formula to an actual case, the forward tilt angle $G$ should be carefully interpreted as an effective value which includes due regard for axial dissymmetry of the airframe under the antenna. With this in mind, the formula can be used, along with assumed or measured parameters of airspeed, cross-wind, course-width, indicator time-lag, sensitivity factors, and initial conditions, to compute, with reasonable accuracy, the flight path to be expected. The following explanation, however, is more graphic.

FIG. 5 is intended to provide an intuitive visualization of the flight path followed by a pilot using the null-bank command meter of FIG. 3. The meter pointer is centered when the polarization reference signal E2 is equal to the course displacement signal E1.

Beginning at position (a), assume a course deviation signal E1 equal to 150 millivolts, corresponding to full-scale "fly-left". The pilot, following the null-bank meter, simply rolls left to center the needle. The projection of the monopole on the horizon in the direction of the station is indicated by the dimension labelled E2 in FIG. 5, and corresponds to the attitude voltage induced in the monopole. The roll to the left stops at a bank angle such that E2 equals 150 millivolts. As a result of the bank, the pilot naturally follows through with a co-ordinated left turn, leading toward position (b).

At position (b) there is an additional component of E2 due to the heading change. Also, E1 has decreased to, say, 105 mv. Thus, it is necessary to roll out of the bank to keep E2 from becoming excessive. The cross-course heading leads toward position (c).

At position (c), the course deviation signal E1 has been reduced to, say, 35 mv. With the existing cross-course heading, it becomes necessary to put in some right-bank in order to nullify some of the left-heading signal and arrive at a resultant attitude signal E2 equal to 35 mv. As a result of the right bank, a coordinated turn to the right naturally follows, leading toward position (d).

As position (d) the airplane is on-course, with E1 essentially zero; it is necessary to level the wings in order to bring E2 also to zero. Thus we have seen the entire beam-bracketting process performed semi-automatically, with no particular attention from the pilot other than to keep the wings more or less in conformity with the null-bank command meter. In fact if the meter voltage were used to control a roll-axis autopilot servo, the beam-following could be quite automatic.

In the presence of a cross-wind, the system, as described, will stabilize with a course-deviation off-set. This off-set can be removed by any one of several methods which are customarily used in automatic flight control systems that employ gyros. One method would be to include a resistance-capacitance error integrator circuit as a part of the filter-adder network 44. Such an addition, however, while resulting in improved performance, does not really form a part of this invention which is concerned primarily with the polarization reference antenna system as a low-cost substitute for bank and heading gyroscopes. Similarly, if the effective forward tilt angle $G$ is too small to produce an adequate heading component of E2, then a bank integrator circuit can be included in network 44 which will have the effect of augmenting or even replacing the forward tilt heading component.

In passing, it should be noted that the polarization reference system does have one characteristic, besides low-cost, which should be considered an advantage over gyros. That is, there is no need to worry about erection to the vertical in the case of a bank gyro, or setting a reference heading in the case of a directional gyro. These are both "built-in" with the polarization reference system.

While the system has been described in connection with horizontally polarized transmitting stations, it should be readily recognized that the method will work also with vertically polarized transmitting stations. In this case it is, of course, necessary to use a horizontally polarized antenna on the airplane for obtaining the attitude signal, in conjunction with the normal vertically polarized antenna for receiving the regular navigational signal.

We claim:

1. A polarization-referenced attitude system for use in flying the beam or course-line of a linearly polarized radio-navigation facility in cooperation with appropriate airborne radio equipment carried by an aircraft, including the usual navigation receiver with input navigational signal supplied by a first antenna means responsive in the polarization plane of the radio signal when the aircraft is in level flight; wherein the said attitude system comprises a second antenna means responsive in a plane perpendicular to the polarization plane of the radio signal when the aircraft is in level flight, modulation means, said second antenna means connected to said modulation means for producing distinctive sidebands, and detecting means responsive to the magnitude and phase of said sidebands, producing thereby a signal indicative of departure from a reference attitude supplied by the polarization plane.

2. An attitude system as defined in claim 1, with said first antenna means being responsive to horizontal polarization; wherein said second antenna means comprises a conductor having some inclination from the vertical, but lying in the fore-and-aft vertical plane of symmetry of the airframe of said aircraft.

3. An attitude system as defined in claim 1, with an antenna system comprising two elements, having mirror symmetry about the airframe center-plane, hybrid means connecting said elements in both sum and difference modes, and with said first antenna means comprising one of said modes; wherein said second antenna means comprises the other of said modes.

4. An attitude system as defined in claim 1. wherein the said detecting means comprising a combining means arranged to add the said sidebands to the regular navigational signal at the receiver input, a band-pass filter at the receiver output arranged to separate out the detected modulation associated with said distinctive sidebands, a phase detector deriving its phase reference from said modulation means, said filter feeding said phase detector and producing thereby a rectified bi-polar direct current which is the said signal indicative of departure from a reference attitude.

5. An attitude system as defined in claim 4 further comprising a filtering and adding circuit and wherein said bi-polar d.c. signal indicative of attitude is applied, along with the usual course-deviation signal derived from the navigation receiver, to said filtering and adding circuit, a left-right bank command indicator responsive to the resulting combined signal, whereby a pilot, banking in response to said indicator is caused to fly his aircraft smoothly to the center-line of the course defined by the navigation facility.

6. The method of producing aircraft pilot command signals by using a polarization-referenced attitude system entirely independent of gyroscopes and gravity and the earth's magnetic field comprising the steps of:

deriving a standard type deviation indicator displacement signal from a conventional signal received from a standard linearly polarized electromagnetic field emanating from a conventional ground radio navigation facility;

developing a signal indicative of heading and attitude changes necessary to maintain the aircraft on a level flight path directly toward the facility by sensing deviation from the polarization plane of said field;

algebraically combining said derived and developed signals to obtain a resultant signal; and indicating to the pilot by using said resultant signal as a command signal, the proper course, heading and attitude to be followed.

7. The method of claim 6 wherein the indicating step is carried out by driving a null-bank command pointer from the resultant signal for visual use by the pilot.

8. The method of claim 6 wherein the developed signal is initially received by an antenna fixed to the aircraft in predetermined tilted position relative to the plane of polarization of said electromagnetic field when the aircraft is headed at the facility in level flight.

9. The method of claim 8 further comprising modulating said initially received signal by audio band modulation; mixing the so-modulated signal with the conventional signal; passing the so-mixed signals through a conventional navigation radio receiver; filtering from the audio output of said receiver the audio modulation; and detecting the filtered audio modulation against the original modulation to yield said developed signal.

10. The method of claim 8 further comprising mixing the conventional signal received and the initially received signal to obtain sum and difference signals; modulating the sum signal by audio band modulation; mixing the modulated sum signal and the difference signal; applying the last mixed signals through a standard navigation receiver to derive said standard type deviation indicator displacement signal as the usual bi-polar D.C. displacement signal; filtering the audio band modulation from the receiver audio output; and detecting the filtered audio band modulation against the original modulation frequency as a reference to develop said signal indicative of heading and attitude changes, also as a bipolar D.C. signal for said algebraic combining with said usual bipolar D. C. displacement signal.

11. A polarization-referencing attitude method for enabling improved flying the beam or course-line by aircraft of a linearly polarized navigation facility broadcasting from earth, comprising the steps of:

deriving a conventional displacement type signal in the usual bi-polar D.C. form from an aircraft received signal from the facility after passing through the standard aircraft navigation receiver;

receiving a signal indicative of attitude and heading changes necessary to correct to a course directly in line with the facility with the aircraft coming to level substantially at the line by picking up said signal at a linear location fixed in the center plane of the aircraft and, tilted through the plane of polarization when the aircraft is level;

modulating said received signal for identification with fixed frequency audio;

mixing the so-modulated signal and the said aircraft received signal from the facility;

passing the mixed signals through said standard receiver to derive said displacement signal in D.C. form;

filtering the audio output of the receiver to obtain the fixed frequency audio;

detecting the filtered fixed frequency audio to produce a bi-polar D.C. signal for attitude and heading changes;

algebraically adding the bi-polar D.C. signals to produce a resultant signal; and driving a null-bank command pointer by the resultant signal.

* * * * *